(12) United States Patent
Kaga et al.

(10) Patent No.: US 8,147,062 B2
(45) Date of Patent: *Apr. 3, 2012

(54) PROGRESSIVE-POWER LENS

(75) Inventors: Tadashi Kaga, Minowa-machi (JP); Toshihide Shinohara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 361 days.

This patent is subject to a terminal disclaimer.

(21) Appl. No.: 11/916,249

(22) PCT Filed: Aug. 9, 2006

(86) PCT No.: PCT/JP2006/316072
§ 371 (c)(1),
(2), (4) Date: Nov. 30, 2007

(87) PCT Pub. No.: WO2007/023714
PCT Pub. Date: Mar. 1, 2007

(65) Prior Publication Data
US 2010/0134755 A1    Jun. 3, 2010

(30) Foreign Application Priority Data
Aug. 22, 2005 (JP) .................... 2005-239407
Jun. 27, 2006 (JP) .................... 2006-176275

(51) Int. Cl.
*G02C 7/02* (2006.01)
(52) U.S. Cl. ........................ 351/169; 351/164
(58) Field of Classification Search .......... 351/161, 351/164, 168–172
See application file for complete search history.

(56) References Cited

U.S. PATENT DOCUMENTS

| 3,472,581 | A | * | 10/1969 | Bronstein ............ 351/161 |
| 3,507,565 | A | | 4/1970 | Alvarez et al. |
| 3,797,922 | A | | 3/1974 | Plummer |
| 4,561,736 | A | | 12/1985 | Furter et al. |
| 6,086,203 | A | | 7/2000 | Blum et al. |
| 6,089,713 | A | | 7/2000 | Hof et al. |
| 6,659,607 | B2 | * | 12/2003 | Miyamura et al. ..... 351/160 R |
| 6,769,768 | B2 | * | 8/2004 | Nishikata ............ 351/168 |
| 7,341,344 | B2 | | 3/2008 | Shirayanagi |

FOREIGN PATENT DOCUMENTS

| EP | 0 101 972 A2 | 3/1984 |
| EP | 0 166 071 A2 | 1/1986 |
| EP | 0 341 998 A1 | 11/1989 |
| EP | 0 857 993 A2 | 8/1998 |
| JP | 2000-227579 A | 8/2000 |
| JP | 20060039526 A | 2/2006 |
| KR | 2000-0022871 A | 4/2000 |
| WO | 97/19382 A1 | 5/1997 |

OTHER PUBLICATIONS

Japanese Patent Office Action for JP 2006-176275 dated Jul. 5, 2011 and English-language translation thereof.

* cited by examiner

*Primary Examiner* — Darryl J Collins
(74) *Attorney, Agent, or Firm* — Sughrue Mion, PLLC

(57) ABSTRACT

An eye-side refractive surface 11 of a distance portion is concave and at least part of an eye-side refractive surface 3 of a near portion is a convex region 31 where one or both of principal meridians of the surface are convex. This provides a back surface progressive-power lens capable of solving disadvantages in terms of lens thickness, external appearance and the like in a back surface progressive-power lens in which the eye-side refractive surface is formed of a progressive-power surface.

3 Claims, 16 Drawing Sheets

S=+3.50D, Ad=2.00D

D1=4.00D
D2f=0.50D
D2n=−1.50D

S=+3.50D, Ad=2.00D

D1=6.00D
D2f=2.50D
D2n=0.50D

PROGRESSIVE-POWER LENS

TECHNICAL FIELD

The present invention relates to a progressive-power lens mainly used for presbyopia correcting glasses.

BACKGROUND ART

A progressive-power lens includes two viewing zones, each having different power, and one viewing zone therebetween where the power progressively changes. These viewing zones have no boundaries, thereby providing excellent exterior appearance and multiple viewing zones in a single lens, each having different power. For these reasons, a progressive-power lens is frequently used as a spectacle lens with accommodation correction capability for such as presbyopia.

FIG. 3 shows a general construction of a progressive-power lens. FIG. 3(a) is a front view and FIG. 3(b) is a longitudinal cross-sectional view. The progressive-power lens 100 includes an upper distance portion 2 that is a viewing zone for viewing relatively distant objects and a near portion 3 that is located below the distance portion 2 and has different power from that of the distance portion 2 to view relatively near objects. These distance portion 2 and near portion 3 are smoothly connected via an intermediate portion (progressive portion) 4 that is a viewing zone having continuously varying power to view intermediate objects between distant and near objects.

A single-piece spectacle lens needs to make use of an eye-side refractive surface 11 and an object-side refractive surface 12 to acquire all the capabilities required for a spectacle lens, such as vertex power that matches with wearer's dioptric power, cylindrical power for correcting astigmatism, addition power for correcting presbyopia, and prismatic power for correcting heterophoria. Thus, the object-side refractive surface 12 of the conventional progressive-power lens is formed of a progressive-power surface that provides continuously varying power in order to configure the distance portion 2, near portion 3 and intermediate portion 4, while the eye-side refractive surface 11 is used, for example, as the refractive surface for correcting astigmatism.

Such a front surface progressive-power lens having a progressive-power surface on the objective-side refractive surface 12 suffers increased distortion, which may be uncomfortable for first-time progressive-power lens wearers or those who replace their differently designed progressive-power lenses.

To avoid such distortion generation in a front surface progressive-power lens due to the change in image magnification, there has recently been commercialized a back surface progressive-power lens in which a progressive-power surface is formed on the eye-side refractive surface 11, as described in WO 97/19382. As shown in FIG. 3(b), the object-side refractive surface 12 of a back surface progressive-power lens 100 is either spherical or rotationally symmetric aspherical. The eye-side refractive surface 11 is formed of a progressive-power surface having the distance portion 2, near portion 3 and intermediate portion 4. The progressive-power surface is combined with a toroidal surface, or even a complicated surface combined with a correcting aspheric element for correcting off-axis aberrations of the lens. Furthermore, JP-A-2000-227579 describes a technology to reduce the thickness of the back surface progressive-power lens 100.

However, to achieve a curved surface to provide addition power on the back surface, the distance portion of the back surface progressive-power lens has to have surface power greater than that of the near portion by the amount of the addition power. Moreover, the back surface progressive-power lens needs to provide power of distance portion required for the distance portion. For example, when the distance portion is prescribed to have positive power, the surface power of the object-side refractive surface needs to be greater according to the prescribed positive power. Consequently, in the back surface progressive-power lens with the distance portion having the prescribed positive power, the convex object-side refractive surface protrudes more than a corresponding front surface progressive-power lens. Thus, although a back surface progressive-power lens is advantageous in terms of optical performance such as image distortion, it is disadvantageous in terms of the lens thickness and external appearance. The technology capable of reducing the thickness of the lens described in JP-A-2000-227579 is still not enough.

The invention has been made in view of the above circumstances and aims to provide a back surface progressive-power lens capable of solving the disadvantages in terms of lens thickness, external appearance and the like typical of a back surface progressive-power lens in which the eye-side refractive surface is formed of a progressive-power surface.

DISCLOSURE OF THE INVENTION

To achieve the above object, a first embodiment of the invention provides a progressive-power lens comprising an object-side refractive surface and an eye-side refractive surface, the eye-side refractive surface including a distance portion having power to view relatively distant objects, a near portion having power to view relatively near objects, and an intermediate portion having power to continuously view intermediate objects between the distant and near objects, the progressive-power lens characterized in that the eye-side refractive surface of the distance portion is concave, and at least part of the eye-side refractive surface of the near portion is a convex region where one or both of principal meridians of the surface are convex.

The back surface progressive-power lens is configured such that a region of the near portion of the eye-side refractive surface is provided with the convex region, which is convex to the eye. The provision of the convex region in the near portion allows the eye-side distance portion to be a small-curvature concave surface for providing a predetermined addition power, as well as allows the curvature of the object-side refractive surface providing power required for the distance portion to be small in accordance with the eye-side small curvature. Therefore, the provision of the convex region in the near portion results in a shallow base curve, thereby providing a thin lens with excellent exterior appearance.

In a second embodiment of the invention, the progressive-power lens according to the first embodiment is characterized in that the absolute value of maximum surface power of the principal meridian of the convex region is not greater than 2 dioptres.

The provision of the convex region in the near portion allows a back surface progressive-power lens with better exterior appearance and reduced thickness. There is a drawback, however, that the shallower base curve increases astigmatism and hence degrades optical performance. The drawback can be overcome by advances in design technology. This application can minimize such optical performance degradation by limiting the degree of convexity of the convex region as well.

In a third embodiment of the invention, the progressive-power lens according to the first or second embodiment is characterized in that the ratio of the surface area of the convex region within a circle having a radius of 25 mm from the geometrical center of the progressive-power lens to the surface area of the circle is less than or equal to 30%.

By limiting the ratio of the surface area of the convex region, degradation of optical performance due to the shallower base curve can be minimized.

INDUSTRIAL APPLICABILITY

The progressive-power lens of the present invention can be mainly used for presbyopia correcting glasses.

BEST MODE FOR CARRYING OUT THE INVENTION

Embodiments of the progressive-power lens according to the invention will be described below, but the invention is not limited thereto.

Figure 1A:
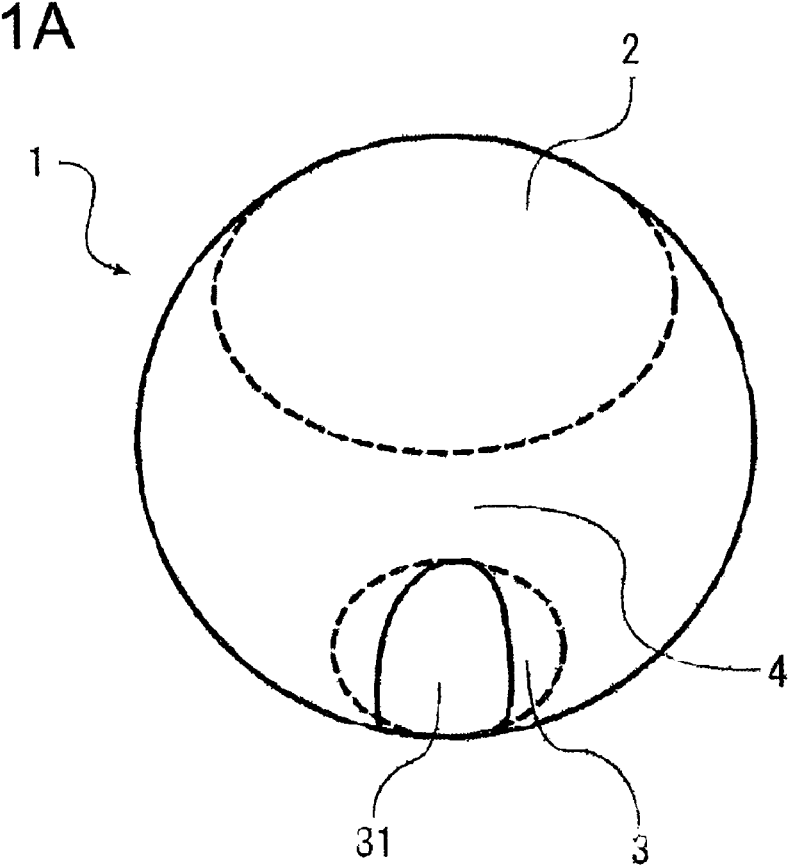
FIG. 1 shows the concept of a progressive-power lens according to the invention, (a) showing a front view and (b) showing a cross-sectional view.
Figure 1B:
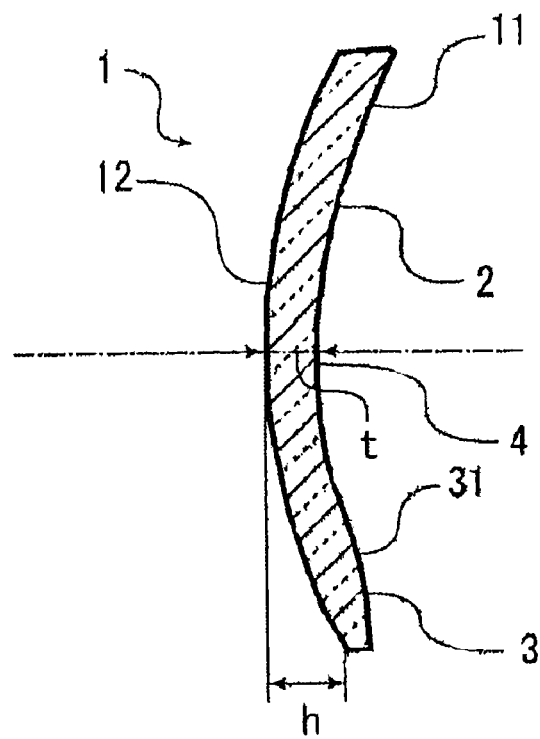

FIG. 1 shows the concept of the progressive-power lens of the invention. FIG. 1(a) is a front view and FIG. 1(b) is a longitudinal cross-sectional view. The progressive-power lens 1 is a meniscus, back surface progressive-power lens in which a concavely shaped eye-side refractive surface 11 is provided with a progressive-power surface and a convexly shaped object-side refractive surface 12 is formed of, for example, a spherical or rotationally symmetric aspherical surface.

The progressive-power surface provided on the eye-side refractive surface 11 has a distance portion 2 having power to view relatively distant objects, a near portion 3 having power to view relatively near objects, and an intermediate portion 4 having power to continuously view objects therebetween. In addition to the progressive-power surface, the eye-side refractive surface 11 is provided with, for example, cylindrical power to correct astigmatism, prismatic power to correct heterophoria, and aspherical surface to correct aberrations.

In the progressive-power lens 1 of the invention, configured as the back surface progressive-power lens mentioned above, the refractive surface of the distance portion 2 is concave to the eye. In other words, the center of curvature of the refractive surface of the distance portion 2 exists on the eye side relative to the refractive surface. In at least part of the refractive surface of the near portion 3, one or both of the principal meridians of the surface are convex to the eye. In other words, the near portion 3 has a convex region 31 where at a point on the refractive surface of the near portion 3, the center of curvature of one or both of the principal meridians of the surface exists on the object side relative to the refractive surface. This convex region 31 has negative average surface power, provided that the sign of a surface power is positive when the shape of the surface is convex to the object and negative when the shape of the surface is convex to the eye.

The convex region 31, disposed on the eye-side refractive surface 11 that includes the distance portion 2 and forms the concave shape of the meniscus lens, is convex to the eye in the region of the near portion 3, as shown in FIG. 1(b). The convex region 31 has been defined above such that one or both of the principal meridians of the surface is convex to the eye because the refractive surface of the back surface progressive-power lens may be a combination of a progressive-power surface and an astigmatism correcting toroidal surface, and in the convex region of the combined refractive surface, one of the principal meridians of the surface may be concave to the eye due to the toroidal surface, while the other principal meridian of the surface may be convex to the eye. To be convex to the eye, at least one of the principal meridians of the surface needs to be convex to the eye. Principal meridians of a surface are meridians having both maximum and minimum curvature at a point on the surface, as defined in the Japanese Industrial Standards (JIS/T7330: published on Oct. 18, 2000: Japanese Industrial Standards Committee).

The provision of the convex region 31 protruding toward the eye in the near portion allows the distance portion 2 on the eye-side refractive surface 11 to be a small-curvature concave surface for providing a predetermined addition power, as well as allows the curvature of the object-side refractive surface 12 providing the power of distance portion required for the distance portion 2 to be small in accordance with the small curvature of the eye-side distance portion 2. The provision of the convex region 31 in the near portion 3 therefore allows a shallow object-side refractive surface 12, referred to as a base curve, thereby providing a thin back surface progressive-power lens 1 with excellent exterior appearance.

Specific description will be given below how the base curve becomes shallower when the convex region is provided in the near portion. For a back surface progressive-power lens, the object-side (front surface) surface power (base curve) D1, eye-side (back surface) surface power of distance portion D2f and eye-side surface power of near portion D2n, and power of distance portion S and addition power Ad that determine prescribed dioptric power of the lens are related to each other:

$$S = D1 - D2f$$

$$Ad = D2f - D2n$$

where the unit of power is dioptre (D) and the signs of surface power D1, D2f and D2n are either positive when the surface is convex to the object (concave to the eye) or negative when the surface is concave to the object (convex to the eye).

For a conventional back surface progressive-power lens, the surface power of near portion D2n is $$D2n \leq 0 \text{ (D)}$$

That is, the near portion is either entirely concave or partly flat.

Thus, when the power of distance portion is positive and the addition power is large, the base curve of a back surface progressive-power lens inevitably becomes deeper than that of a lens having a progressive surface on the front surface (front surface progressive lens) because the base curve is the sum of the power of distance portion S, the addition power Ad and the surface power of near portion D2n as shown in the following equation.

$$D1 = S + D2f = S + Ad + D2n$$

This results in unattractive protruding exterior appearance as well as increased center thickness.

In contrast, when a convex region is provided in the near portion, the surface power of near portion D2n becomes negative, allowing a shallower object-side (front surface) surface power (base curve) D1.

Figure 2A:
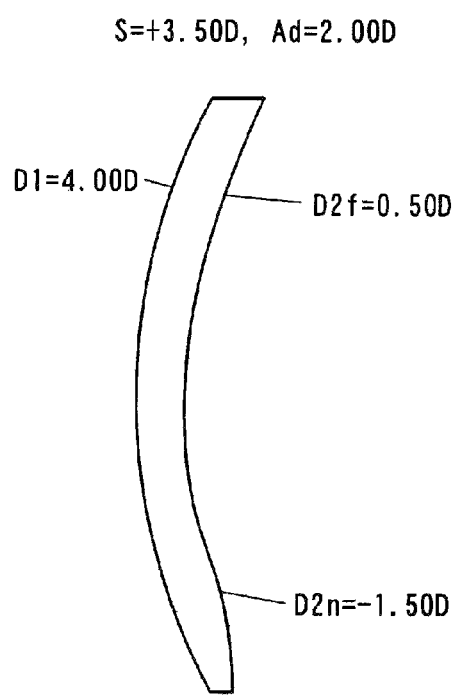
FIG. 2 shows power of each surface of a progressive-power lens of the invention (a) and a conventional progressive-power lens (b)
Figure 2B:
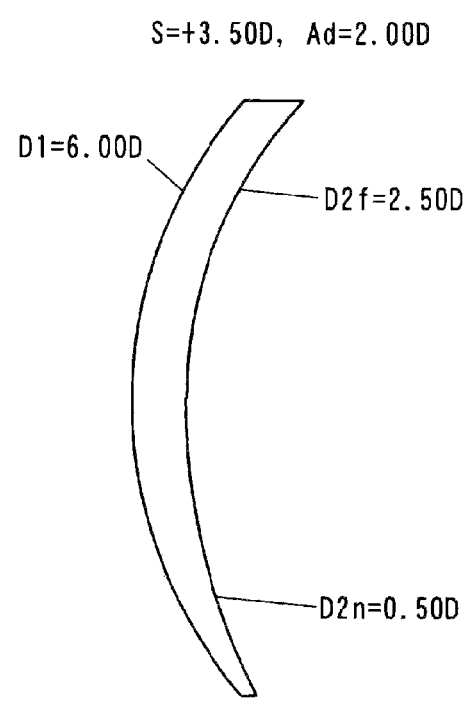
Figure 3A:
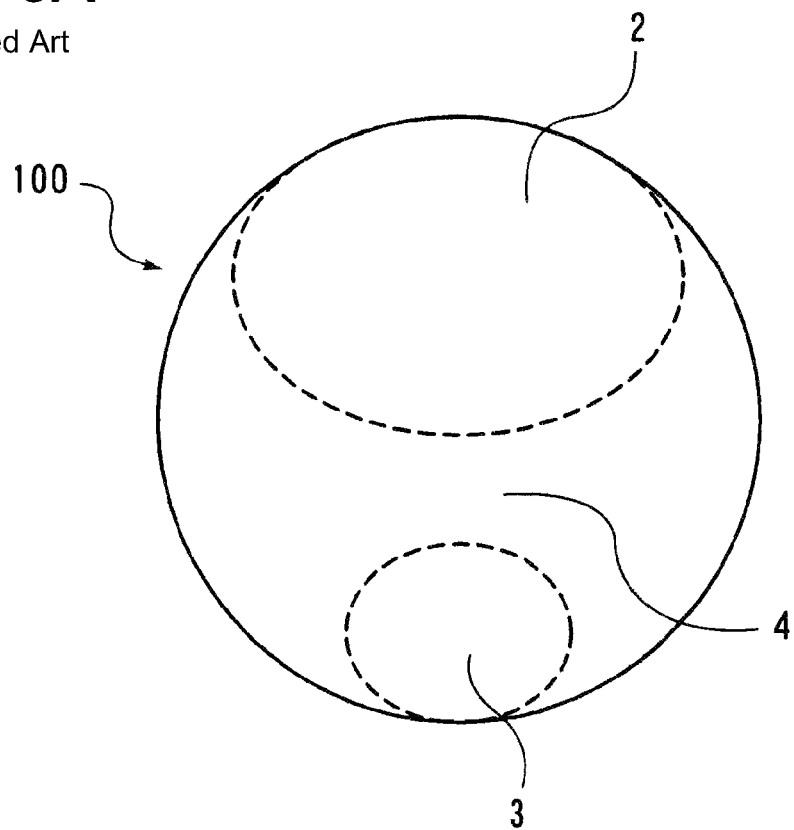
FIG. 3 shows the concept of a conventional progressive-power lens, (a) showing a front view and (b) showing a cross-sectional view.
Figure 3B:
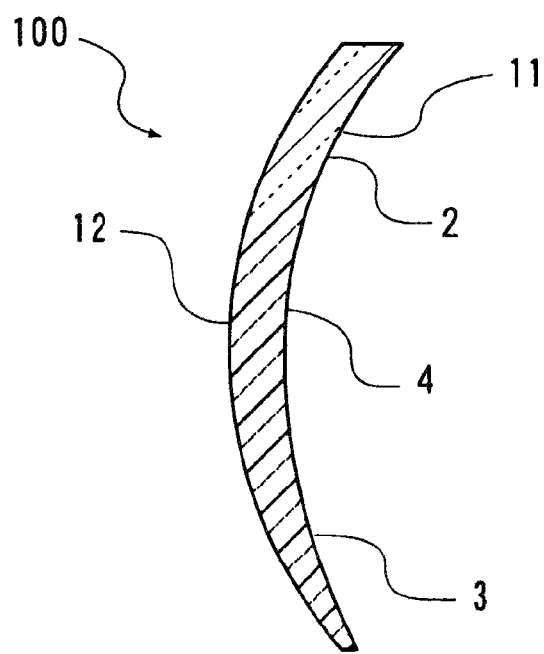

This will be numerically described with reference to FIG. 2. FIG. 2(a) shows a back surface progressive-power lens of the invention. FIG. 2(b) shows a conventional back surface progressive-power lens having an entirely concave, eye-side refractive surface.

Both lenses have the same prescribed power; power of distance portion S of 3.50 D and addition power Ad of 2.00 D. For the conventional back surface progressive-power lens shown in FIG. 2(b), the surface power of near portion D2n is set to, for example, +0.50 D (concave surface), which is close to a flat surface. This value is added to the addition power Ad of 2.00 D, resulting in the surface power of distance portion D2f of 2.50 D. The resulting surface power of distance portion D2f is added to the power of distance portion S of 3.50 D, resulting in the object-side surface power (base curve) D1 of 6.00 D, which corresponds to a deeper base curve.

In the back surface progressive-power lens of the invention shown in FIG. 2(a), the surface power of near portion D2n of the convex region in the near portion is concave to the object, so that it can be set to, for example, −1.50 D (convex to the eye). This value is added to the addition power Ad of 2.00 D, resulting in the surface power of distance portion D2f of 0.50 D. The resulting surface power of distance portion D2f is added to the power of distance portion S of 3.50 D, resulting in the object-side surface power (base curve) D1 of 4.00 D, which corresponds to a shallower base curve.

As described above, the back surface progressive-power lens of the invention provided with a convex region in the near portion has the shallower base curve, allowing better exterior appearance and reduced thickness of the lens. There is a drawback, however, that the shallower base curve increases astigmatism and hence degrades optical performance over a conventional back surface progressive-power lens in which the entire eye-side refractive surface is concave. Also, when a convex region protruding toward the eye is provided on a concavely shaped eye-side refractive surface, the distance portion becomes concave by the amount of addition power, resulting in a complicated eye-side refractive surface in which concave and convex surfaces are mixed, which will generate a problem of difficult surface creation and mirror polishing processes.

The problem of the processes being difficult to perform has been overcome by recent significant advances in manufacturing technology. The problem of increased astigmatism has also been overcome by improvement in design technology due to recent computer developments, which enables appropriately adding an astigmatism correcting aspherical surface.

A study of the degree of convexity of the convex region to improve optical performance has shown that the absolute value of maximum surface power of the principal meridian, which is convex to the eye, of the convex region is not desirably greater than 2 dioptres, more desirably 1.5 dioptre. Too large convexity of the convex region may degrade optical performance and render astigmatism correction based on adding an aspherical surface difficult. Larger degree of convexity also causes more light reflection at the protruding convex region, resulting in troublesome reflected light. Furthermore, larger degree of convexity brings the refractive surface of the convex region closer to the eye, increasing the risk of contact with eyelashes.

It has also been shown that the area of the convex region affects optical performance. Specifically, the ratio of the surface area of the convex region within a circle having a radius of 25 mm from the geometrical center of a circular lens before the edging process to the surface area of the circle is desirably less than or equal to 30%, more desirably 20%, and most desirably 15%. Greater surface ratio of the convex region than this range may degrade optical performance, render astigmatism correction based on adding an aspherical surface difficult, and increases troublesome reflection in the convex region.

The back surface progressive-power lens of the invention is available in several types of design. For example, in application-oriented design, there is a so-called distance and near type lens designed such that the viewing zones for distant and near objects are arranged in a well balanced manner and the length of progressive corridor is set to about 10 to 16 mm to facilitate eye rotation during viewing near objects. There are also a so-called intermediate and near type lens in which a priority is given to the vision at intermediate distance, somewhere around 1 meter, through reading distance, and a so-called near and near type lens in which a particular priority is given to the vision at reading distance. These intermediate and near type and near and near type lenses are designed such that the length of progressive corridor is about 19 to 25 mm in order to achieve a broad viewing zone when viewing intermediate-distance objects. The desirable surface ratio of the convex region mentioned above also applies to such intermediate and near type and near and near type lenses in which the near portion is the main portion of the lens. Aberration-oriented design for distortion and astigmatism distributions roughly falls into two types: a localized aberration type in which aberrations are localized in a narrow progressive portion between enlarged distance and near portions, and a distributed aberration type in which aberrations in the intermediate portion are distributed in an enlarged progressive portion. The invention can be applied to such different types of design.

Figures 4A, 4B:
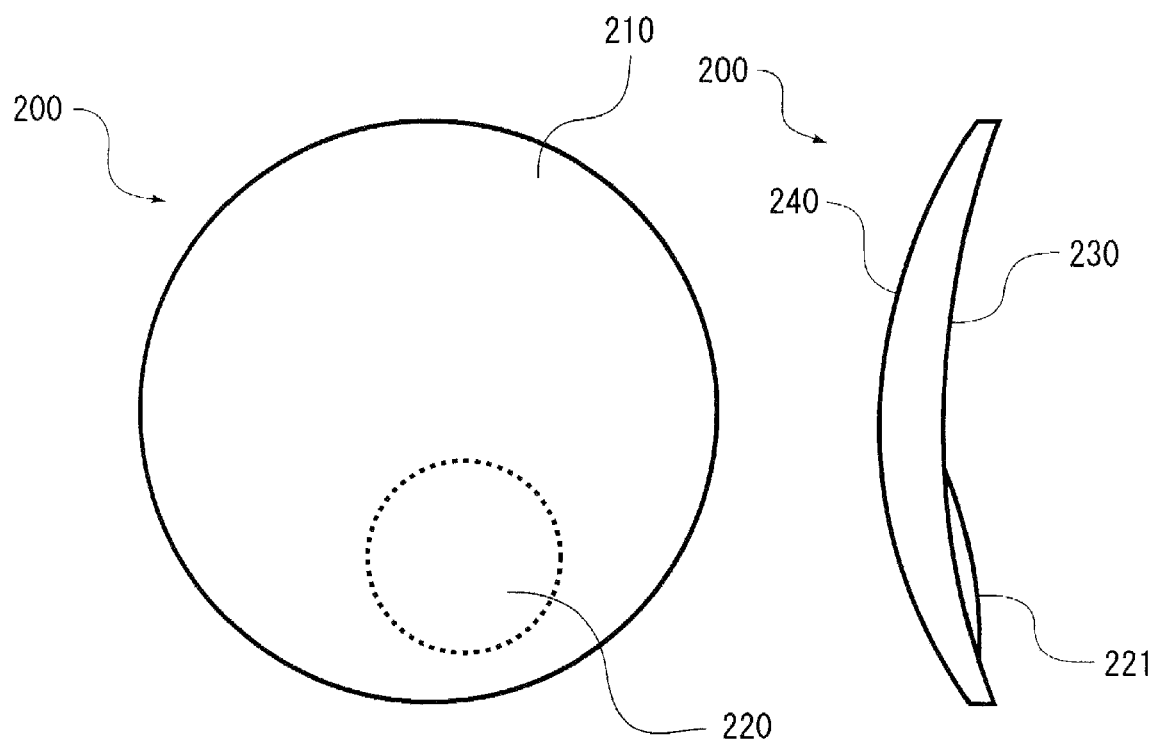
FIG. 4 shows one example of a bifocal lens with a segment lens on the eye-side refractive surface, (a) showing a front view and (b) showing a cross-sectional view.

There is a known conventional bifocal lens in which the eye-side refractive surface is provided with a segment lens. FIG. 4 shows one example of a bifocal lens with a segment lens on the eye-side refractive surface. FIG. 4(a) is a front view and FIG. 4(b) is a longitudinal cross-sectional view. The bifocal lens 200 is divided into a distance portion 210 and a near portion 220. In general, the distance portion 210 is referred to as a main lens and the near portion 220 is referred to as a segment lens. The bifocal lens 200 shown in FIG. 4 is formed by affixing the segment lens 220 onto the eye-side refractive surface 230, and has a convex object-side refractive surface 240, a concave eye-side refractive surface 230 of the main lens 210 and an eye-side refractive surface 221 of the segment lens 220 that is convex to the eye.

The bifocal lens 200 with the segment lens 220 on the eye-side refractive surface 230 is similar in terms of exterior appearance to the back surface progressive-power lens 1 with the convex region on the eye-side refractive surface according to the invention because both lenses have one thing in common in that the lower portion of the concave eye-side refractive surface has a protruding surface.

However, the bifocal lens 200 has a dividing line formed between the eye-side refractive surface 230 of the main lens 210 and the refractive surface 221 of the segment lens. The bifocal lens 200 is a so-called multifocal lens with a boundary, so that it has a disadvantage that images become discontinuous at the dividing line. It also has a problem that its exterior appearance tells that it is a presbyopia correcting lens. There also exists a seamless bifocal lens in which a smoothed dividing line at the boundary is imperceptible. However, this seamless bifocal lens has a problem that images get blurred along the width of the smoothed portion, which renders the lens optically unusable. In either case, a bifocal lens with a segment lens does not have an intermediate portion (progressive portion) that is a viewing zone having a continuously varying power for viewing intermediate-distance objects between distant and near objects, resulting in a spectacle lens totally different from a progressive-power lens.

EXAMPLES

Example 1

A back surface progressive-power lens was designed in the following conditions: surface power of distance portion D2$f$ is 1.00 D; surface power of near portion D2$n$ is −1.00 D; addition power Ad is 2.00 D; power of distance portion S is 3.50 D; power of the object-side refractive surface (base curve) D1 is 4.50 D; and the near portion on the eye-side refractive surface was provided with a convex region that protrudes toward the eye. The refractive index of the lens material was 1.66. The lens material with this same refractive index was used in all the following Examples and Comparison Example. In this design, the near portion of a conventional, entirely concave back surface progressive-power lens was simply provided with the convex region and the increased astigmatism due to the shallower base curve was not corrected.

In this design, provided that the lens is circular with a diameter of 70 mm and a line connecting the geometrical centers of the object-side and eye-side refractive surfaces is the center line, the overhang h that is the distance in the center line direction between the geometrical center of the object-side refractive surface and the outer edge of the object-side refractive surface (see FIG. 1(b)) was 4.2 mm, and the center thickness t that is the distance between the centers (see FIG. 1(b)) was 4.4 mm.

Figure 5:
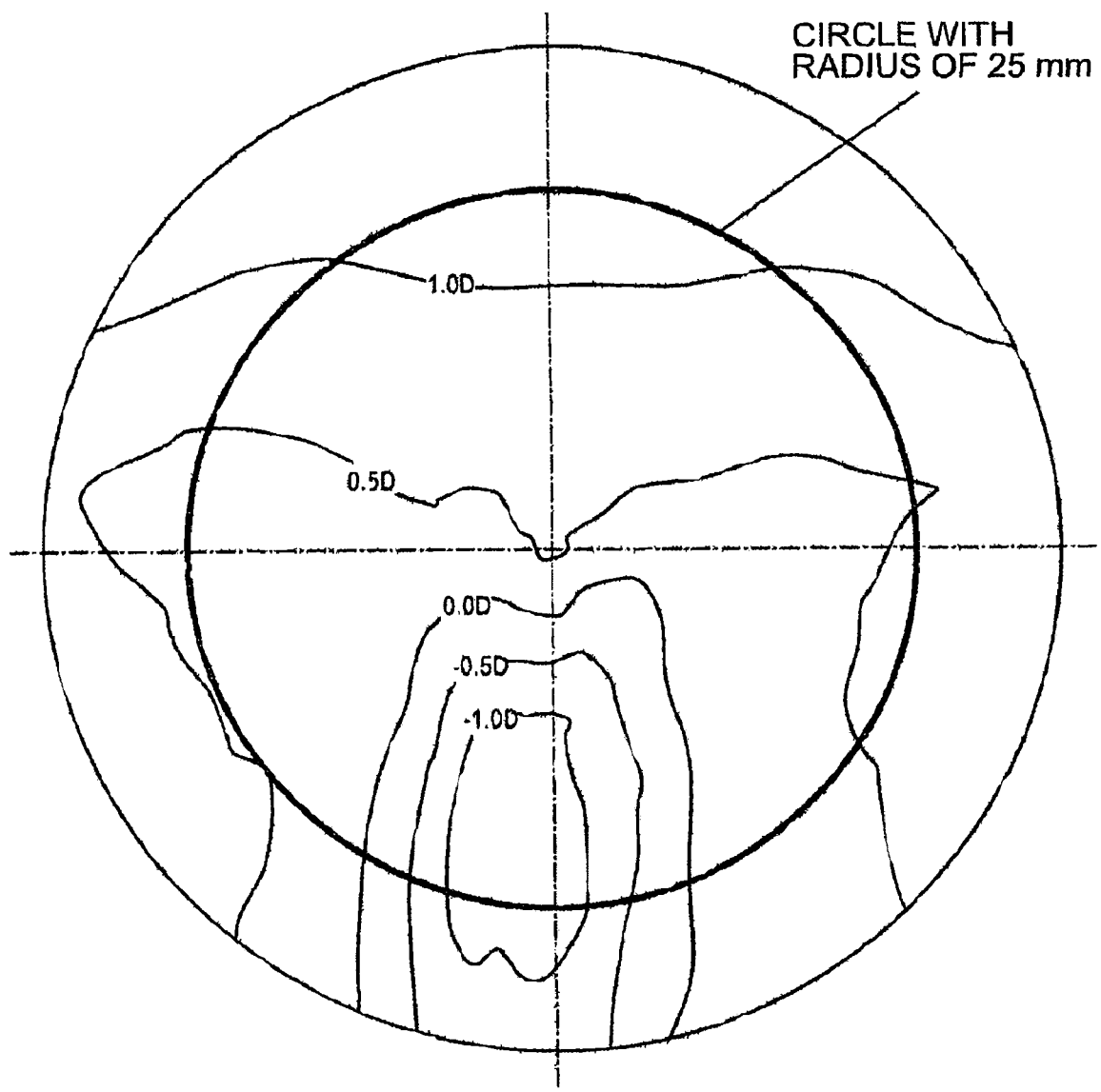
FIG. 5 shows surface power distribution over the eye-side refractive surface of the progressive-power lens of Example 1.

FIG. 5 shows the surface power distribution over the eye-side refractive surface of the right-eye back surface progressive-power lens of this design (the near portion is displaced toward the nose in consideration of convergence). FIG. 5 shows a circle with a radius of 25 mm from the geometrical center, which is the intersection point of the horizontal and vertical lines shown in dashed lines. The convex region occupies 21% of the area inside the circle.

Figure 6:
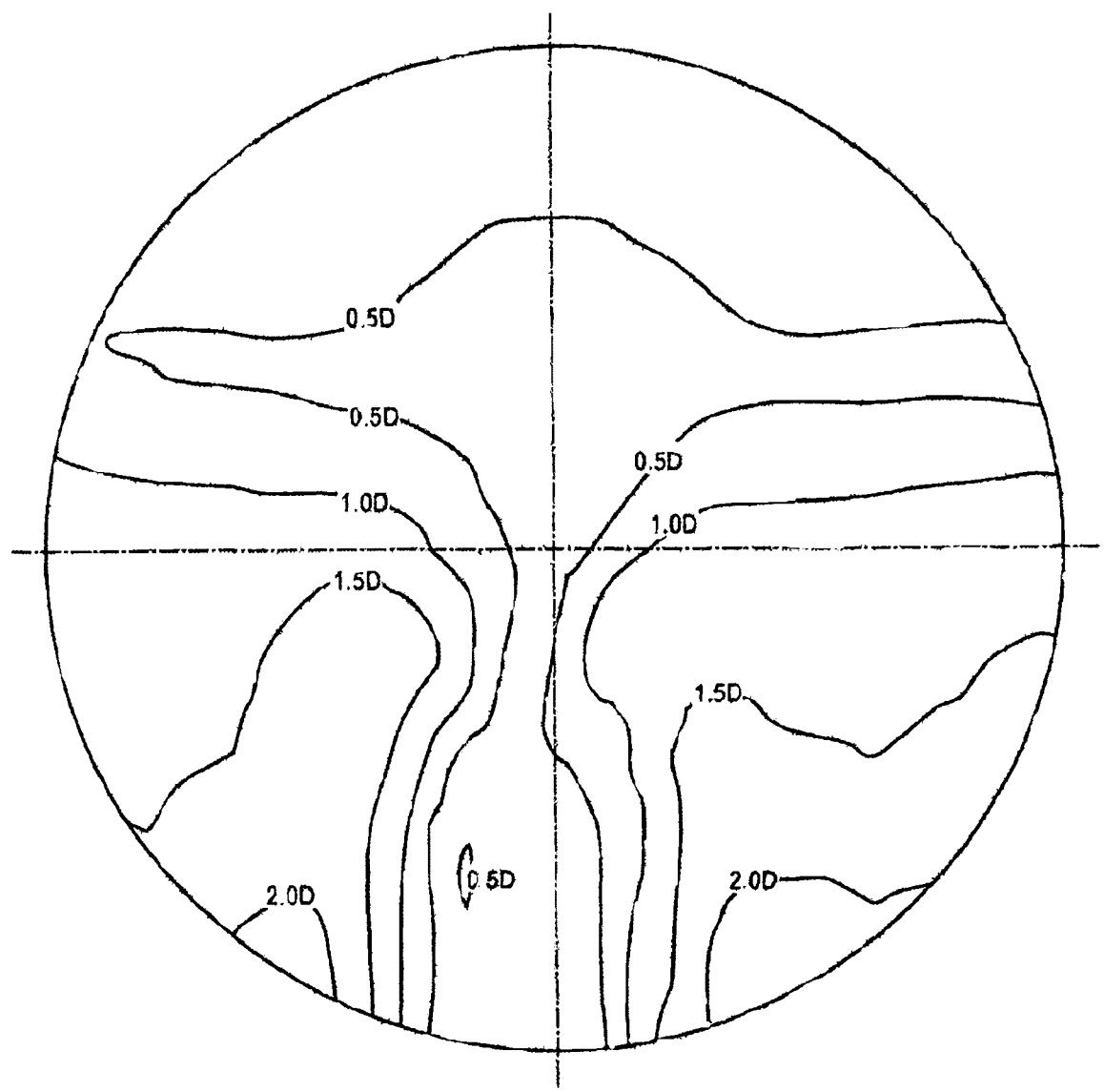
FIG. 6 shows astigmatism distribution over the eye-side refractive surface of the progressive-power lens of Example 1.
Figure 7:
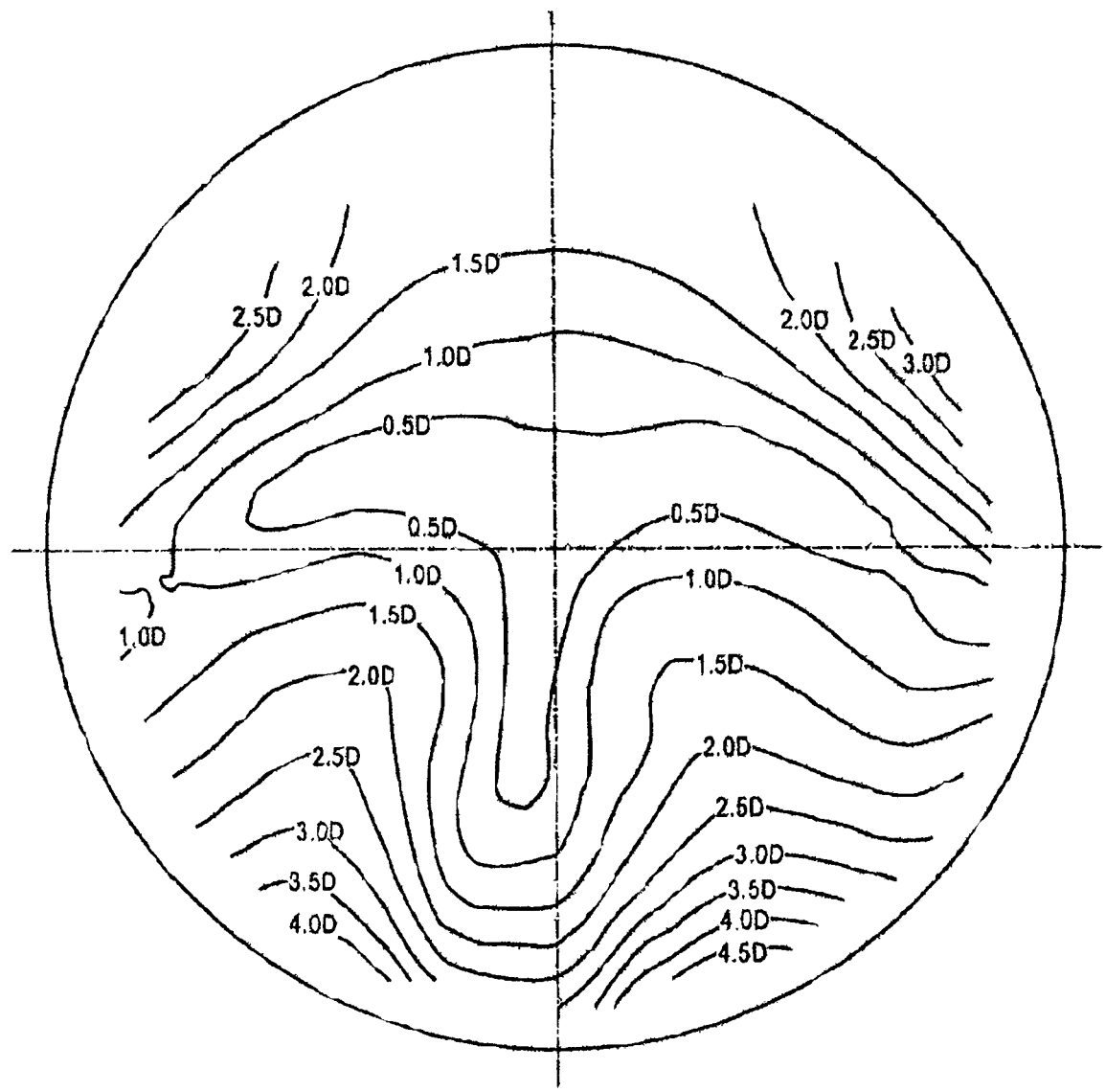
FIG. 7 shows astigmatism distribution in 'as worn' position of the progressive-power lens of Example 1.
Figure 8:
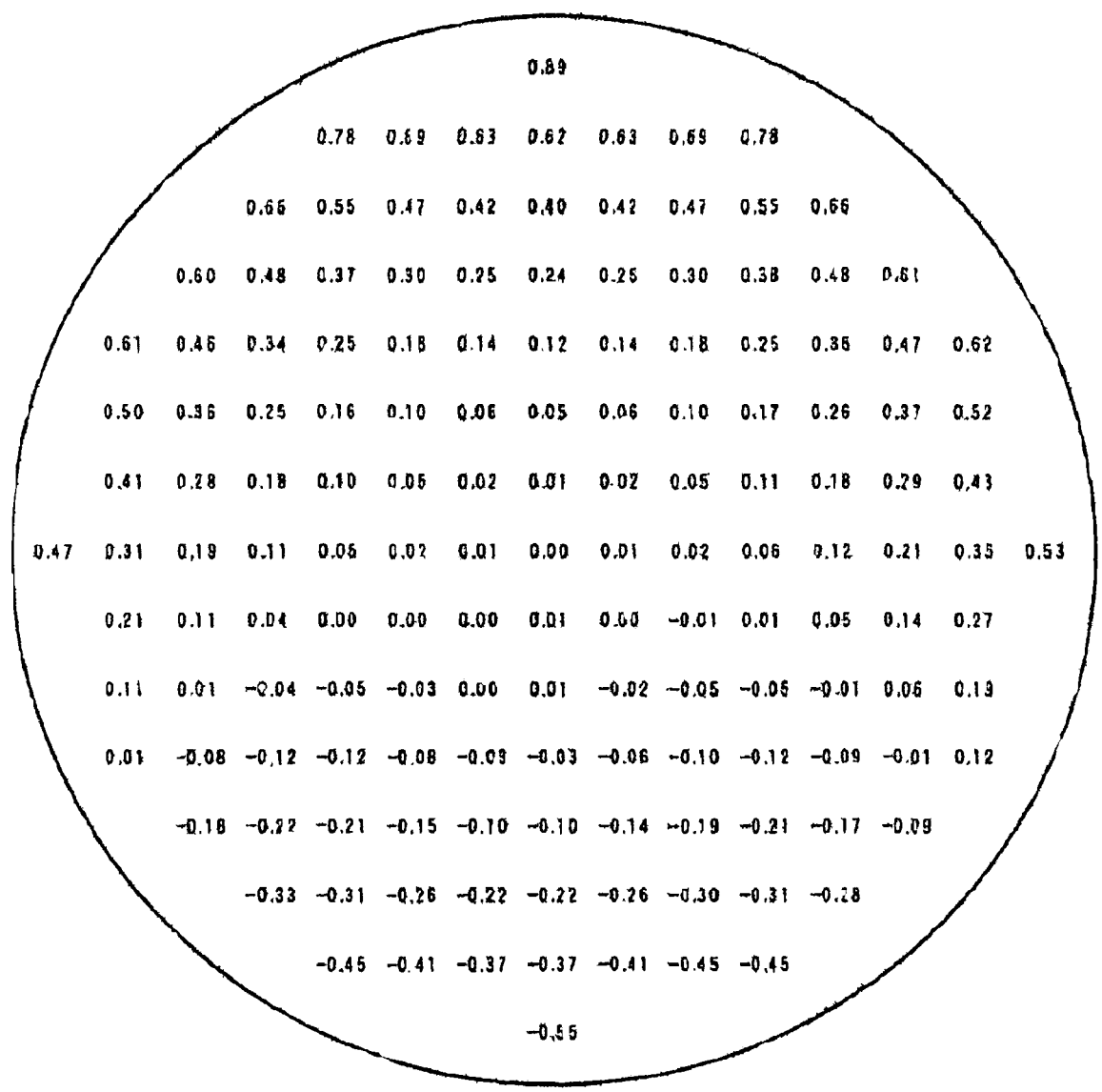
FIG. 8 shows coordinates over the eye-side refractive surface of the progressive-power lens of Example 1.

FIG. 6 shows the astigmatism distribution over the eye-side refractive surface. FIG. 7 shows the distribution of actual astigmatism affecting the eye of the wearer (hereinafter referred to as "astigmatism distribution in 'as worn' position") when the wearer wears the lens and views objects at the intended distances for the distance, intermediate and near portions. FIG. 8 shows coordinates over the eye-side refractive surface with reference to the origin, which is the geometrical center of the lens.

Example 2

A back surface progressive-power lens was designed in the following conditions: surface power of distance portion D2$f$ is 1.00 D; surface power of near portion D2$n$ is −1.00 D; addition power Ad is 2.00 D; power of distance portion S is 3.50 D; power of the object-side refractive surface (base curve) D1 is 4.50 D; and the near portion of the eye-side refractive surface was provided with a convex region that protrudes toward the eye. In this design, an aspherical surface was added to correct the increased astigmatism due to the shallower base curve.

In this design, provided that the lens is circular with a diameter of 70 mm, the overhang h that is the distance in the center line direction between the geometrical center of the object-side refractive surface and the outer edge of the object-side refractive surface was 4.2 mm, and the center thickness t was 4.1 mm. Since the aspherical surface was added, the center thickness t was thinner than that of Example 1 by 0.3 mm.

Figure 9:
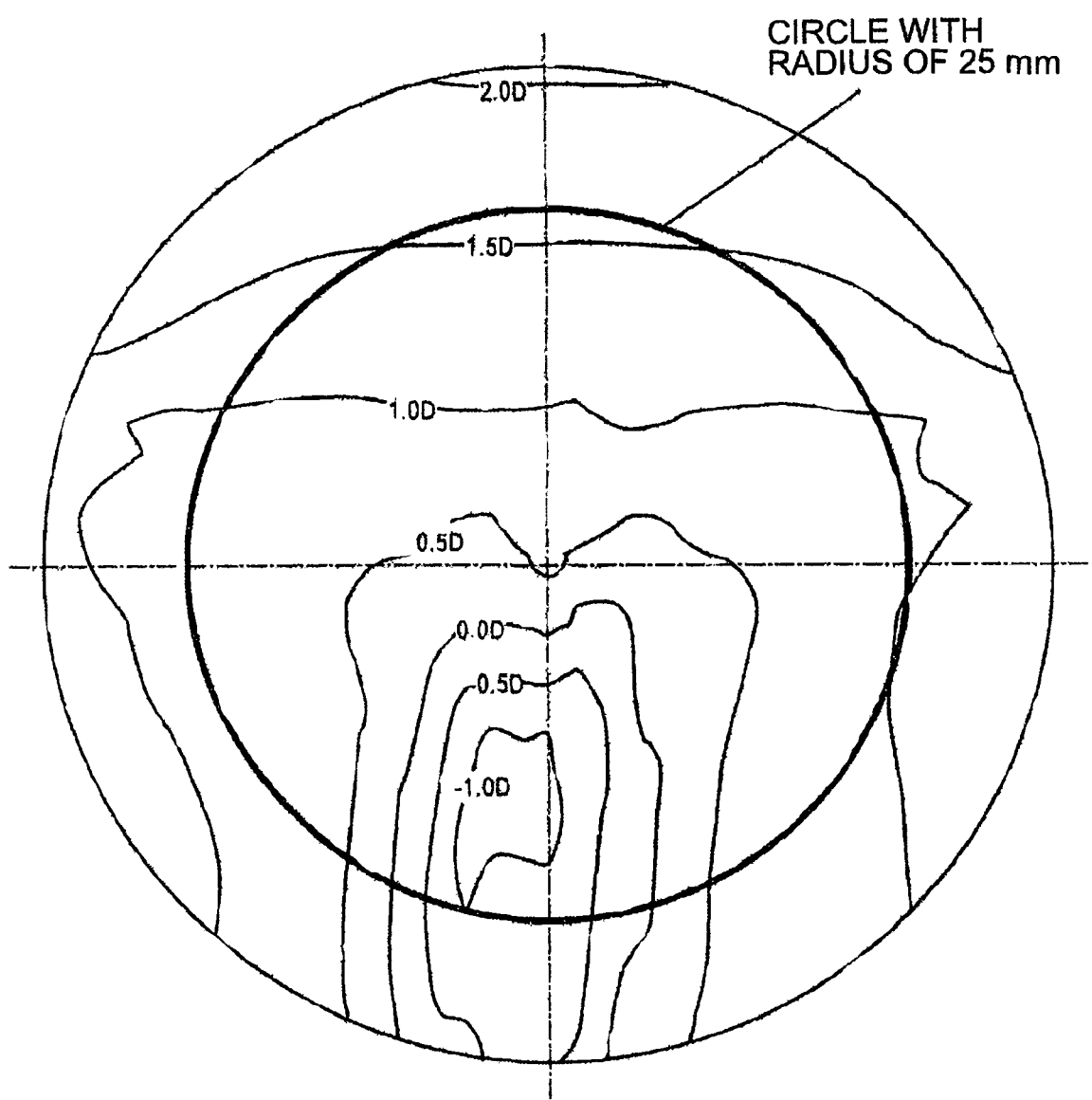
FIG. 9 shows surface power distribution over the eye-side refractive surface of the progressive-power lens of Example 2.
Figure 10:
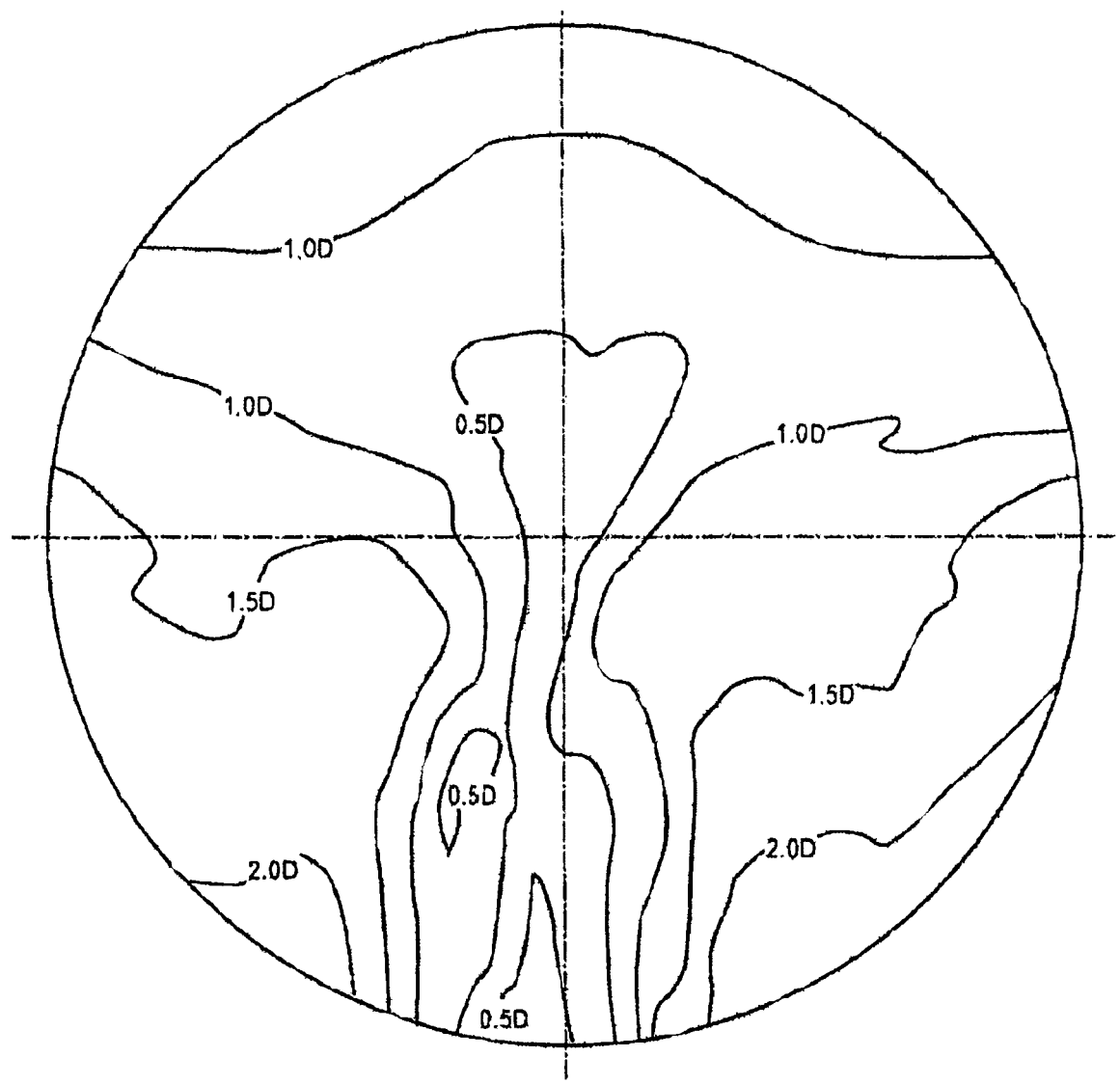
FIG. 10 shows astigmatism distribution over the eye-side refractive surface of the progressive-power lens of Example 2.
Figure 11:
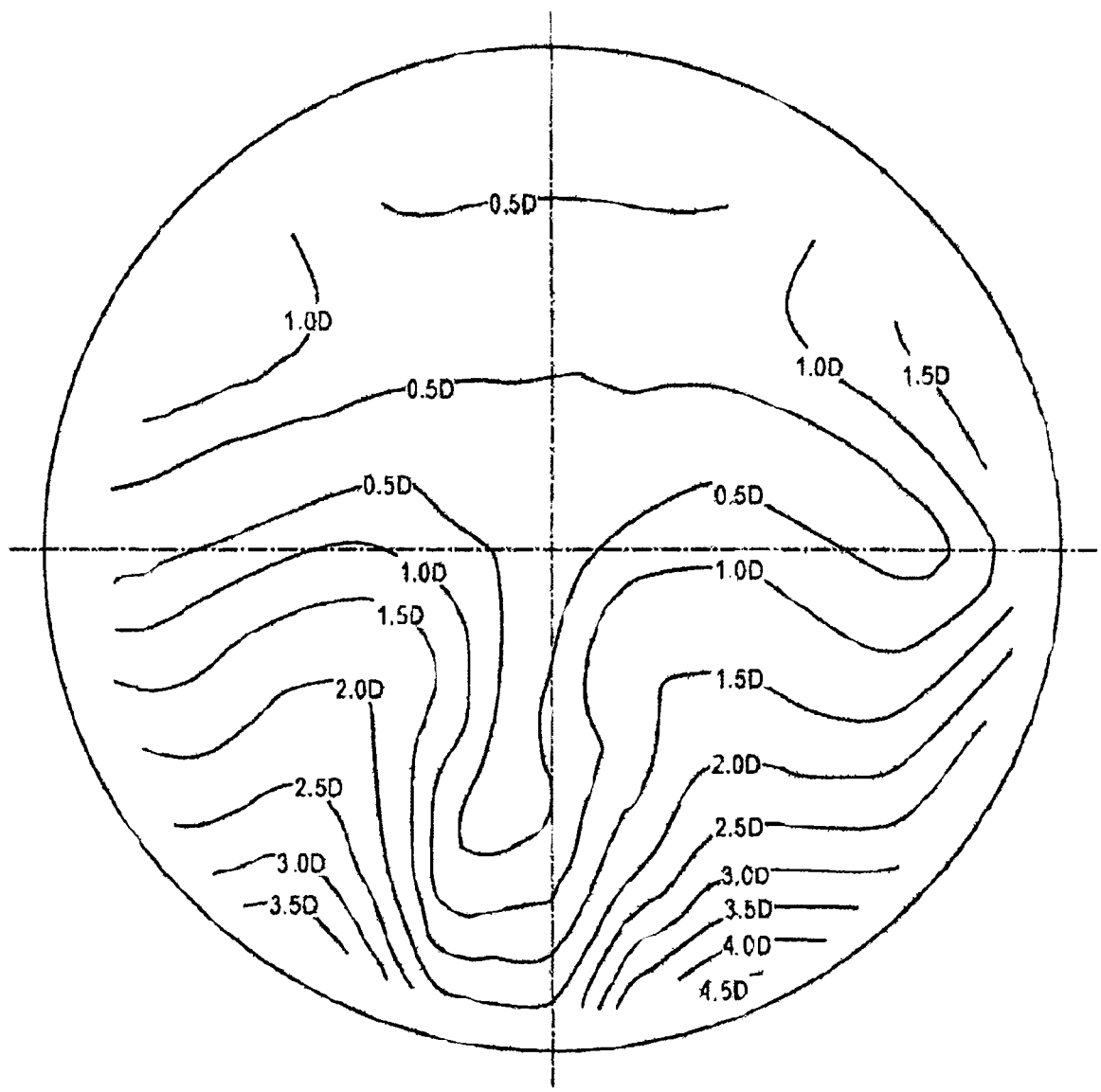
FIG. 11 shows astigmatism distribution in 'as worn' position of the progressive-power lens of Example 2.
Figure 12:
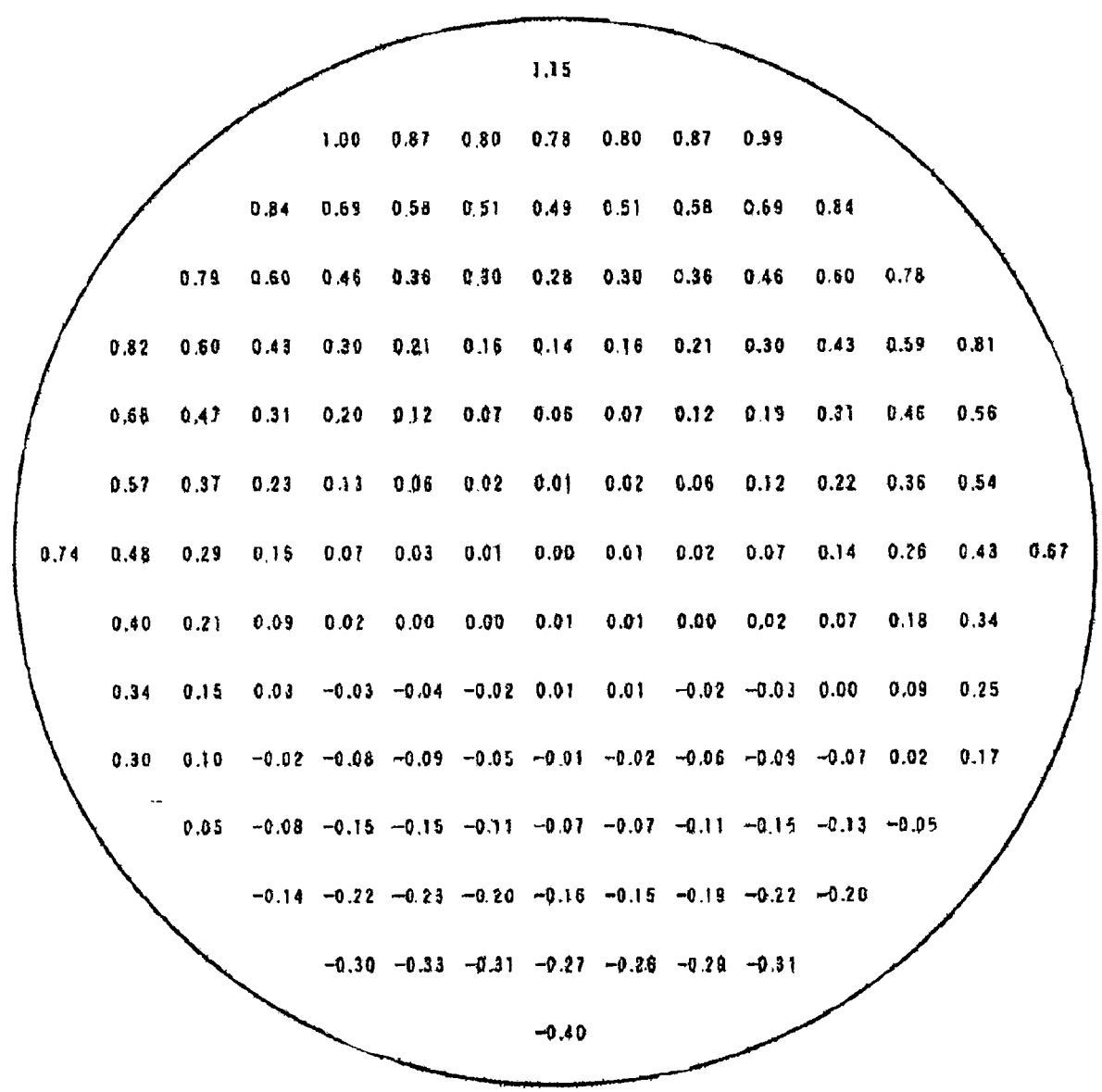
FIG. 12 shows coordinates over the eye-side refractive surface of the progressive-power lens of Example 2.

FIG. 9 shows the surface power distribution over the eye-side refractive surface of the right-eye back surface progressive-power lens of this design. FIG. 9 shows a circle with a radius of 25 mm from the geometrical center, which is the intersection point of the horizontal and vertical lines shown in dashed lines. The convex region occupies 17% of the area inside the circle. FIG. 10 shows the astigmatism distribution over the eye-side refractive surface. FIG. 11 shows the astigmatism distribution in 'as worn' position. FIG. 12 shows coordinates over the eye-side refractive surface with reference to the origin, which is the geometrical center of the lens.

Comparing FIG. 6 showing the astigmatism distribution over the eye-side refractive surface of Example 1 with FIG. 10 showing the astigmatism distribution over the eye-side refractive surface of Example 2, Example 2 has more astigmatism because in Example 2, an aspherical surface was added to the eye-side refractive surface in order to correct the increased astigmatism due to the shallower base curve. However, comparing FIG. 7 showing the astigmatism distribution in 'as worn' position of Example 1 with FIG. 11 showing the astigmatism distribution in 'as worn' position of Example 2, it is shown that the astigmatism of Example 2 is better corrected as a whole.

Comparison Example

A conventional back surface progressive-power lens that has an entirely concave eye-side refractive surface and does not have a convex region in the near portion was designed in the following conditions: surface power of distance portion D2$f$ is 3.00 D; surface power of near portion D2$n$ is 1.00 D; addition power Ad is 2.00 D; power of distance portion S is 3.50 D; and power of the object-side refractive surface (base curve) D1 is 6.50 D.

In this design, provided that the lens is circular with a diameter of 70 mm, the overhang h that is the distance in the center line direction between the geometrical center of the object-side refractive surface and the outer edge of the object-side refractive surface was 6.2 mm, and the center thickness t was 4.4 mm. In this Comparison Example design, the overhang h of the object-side refractive surface is greater than those of Examples 1 and 2 of the invention by an amount of as much as 2.0 mm. The center thickness t is substantially the same as that of Example 1 in which no astigmatism correcting aspherical surface is added, while it is greater than that of Example 2 in which an aspherical surface is added by an amount of 0.3 mm.

Figure 13:
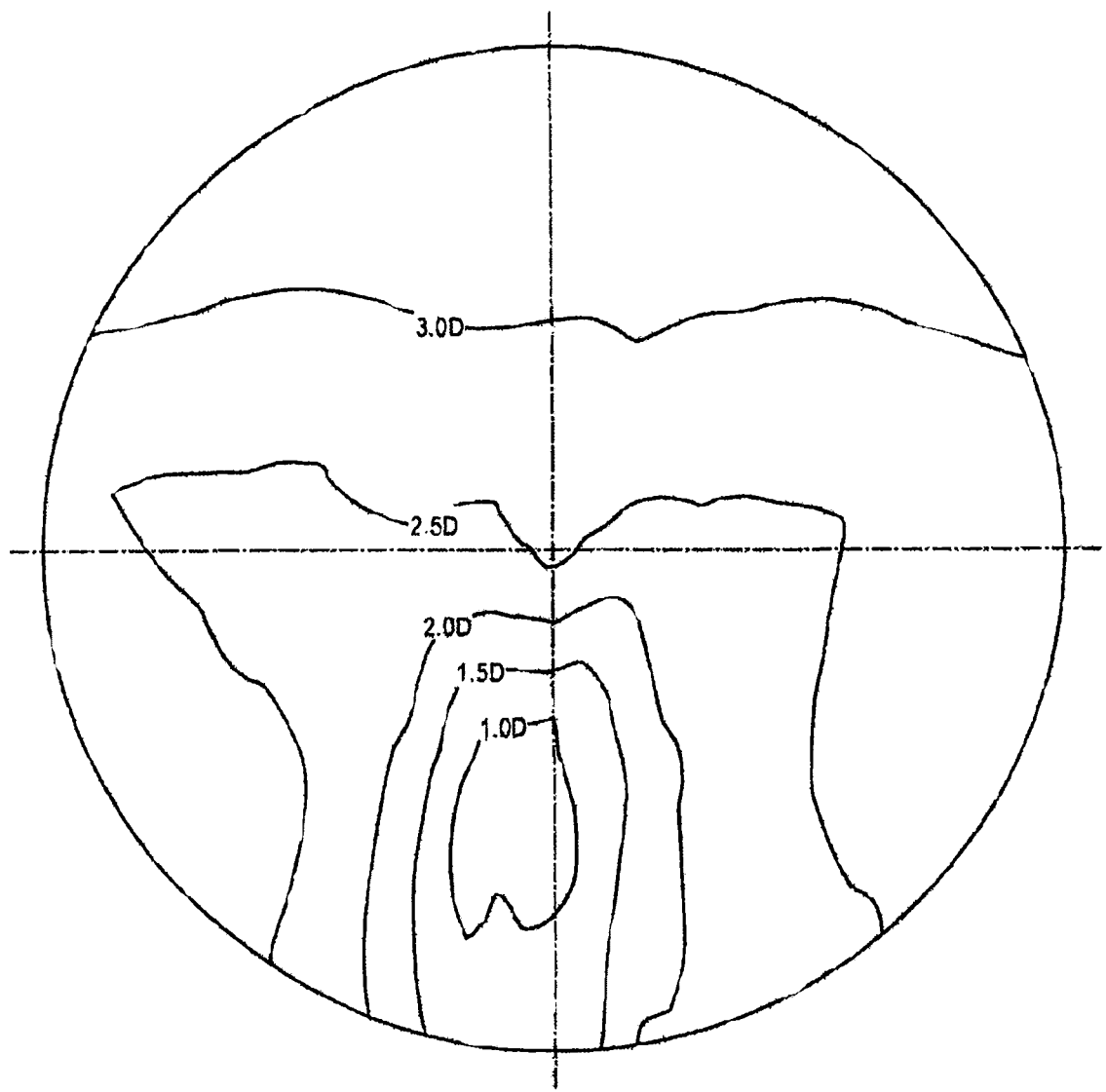
FIG. 13 shows surface power distribution over the eye-side refractive surface of the progressive-power lens of Comparison Example.
Figure 14:
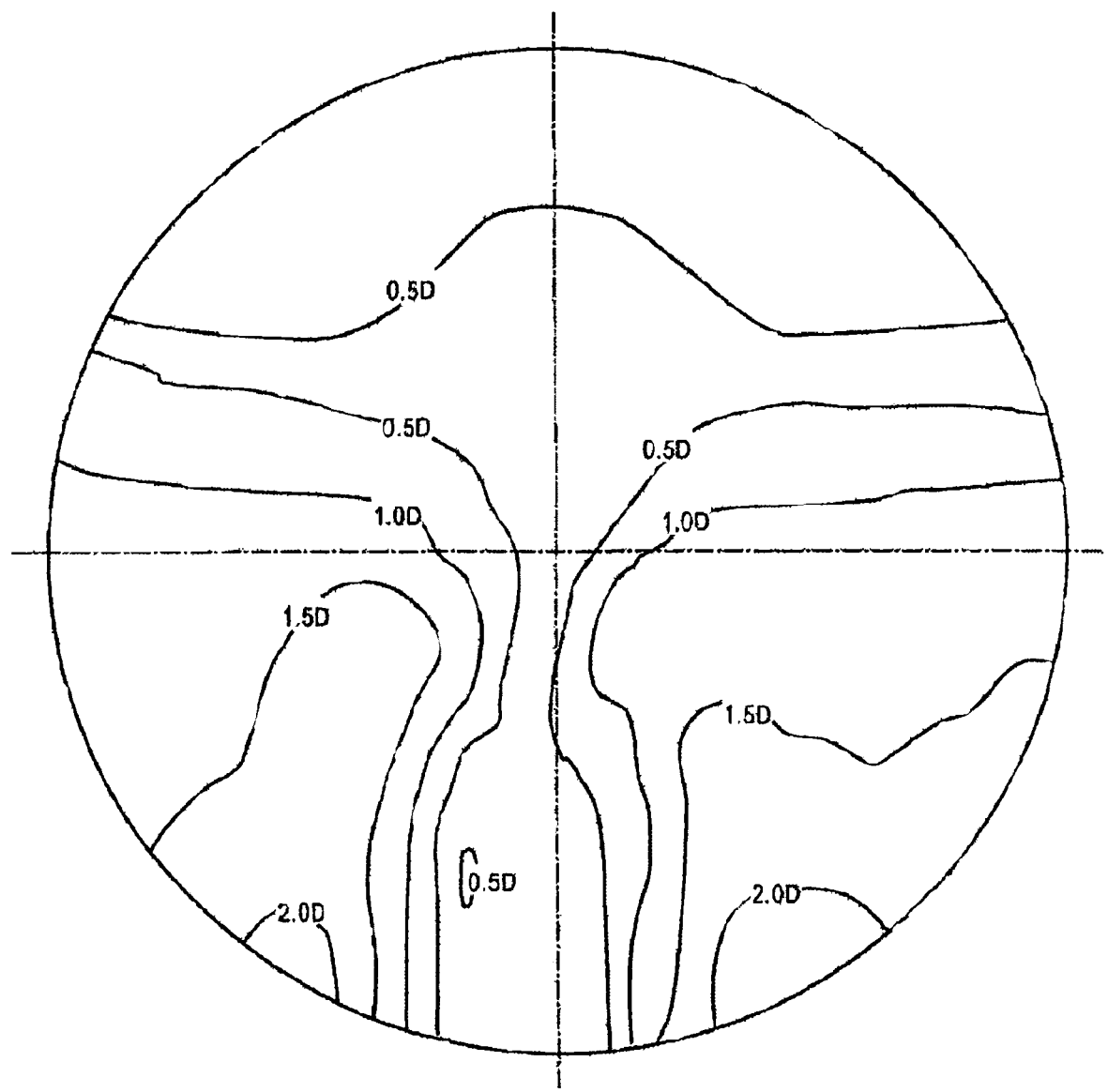
FIG. 14 shows astigmatism distribution over the eye-side refractive surface of the progressive-power lens of Comparison Example.
Figure 15:
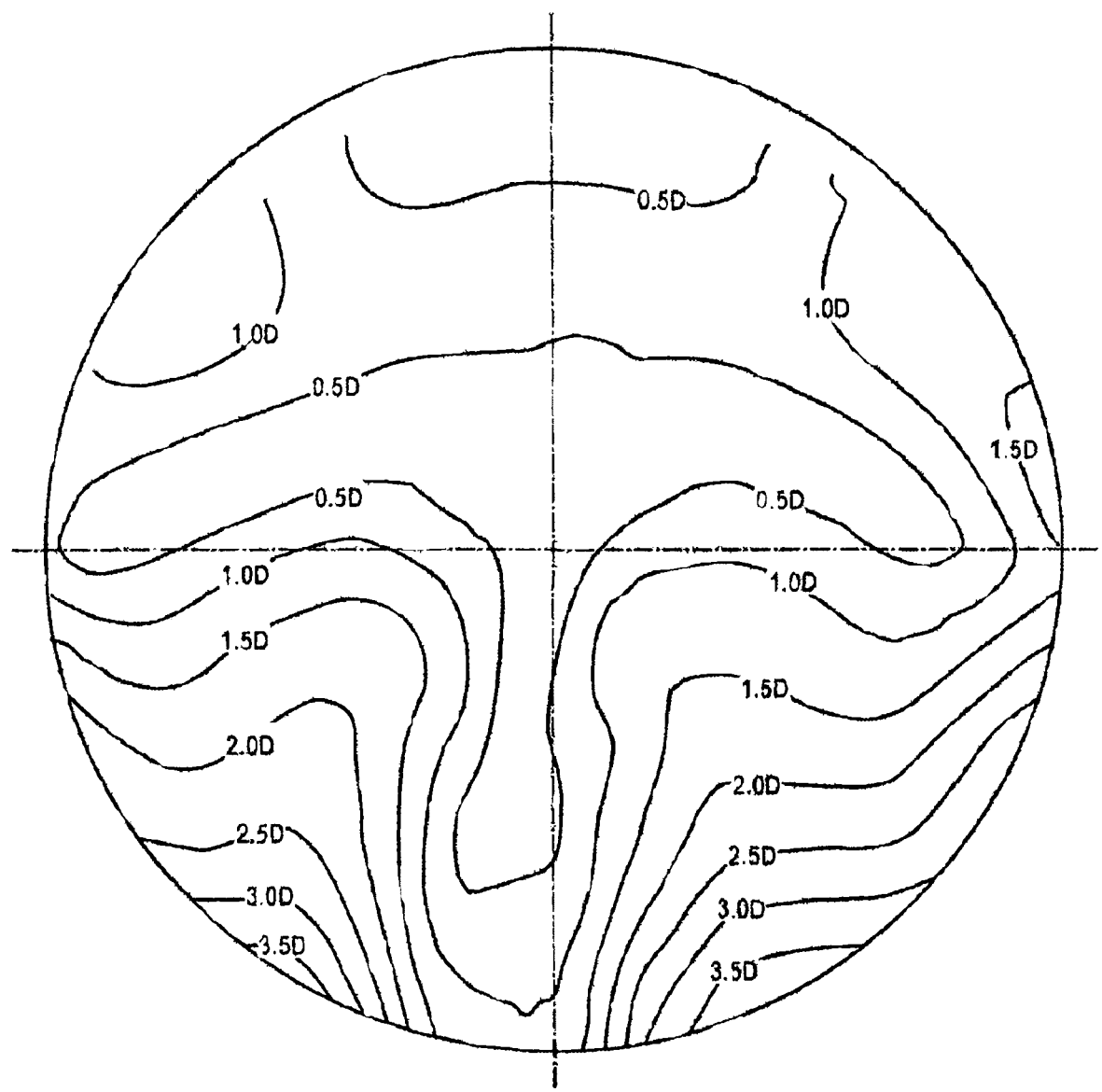
FIG. 15 shows astigmatism distribution in 'as worn' position of the progressive-power lens of Comparison Example.
Figure 16:
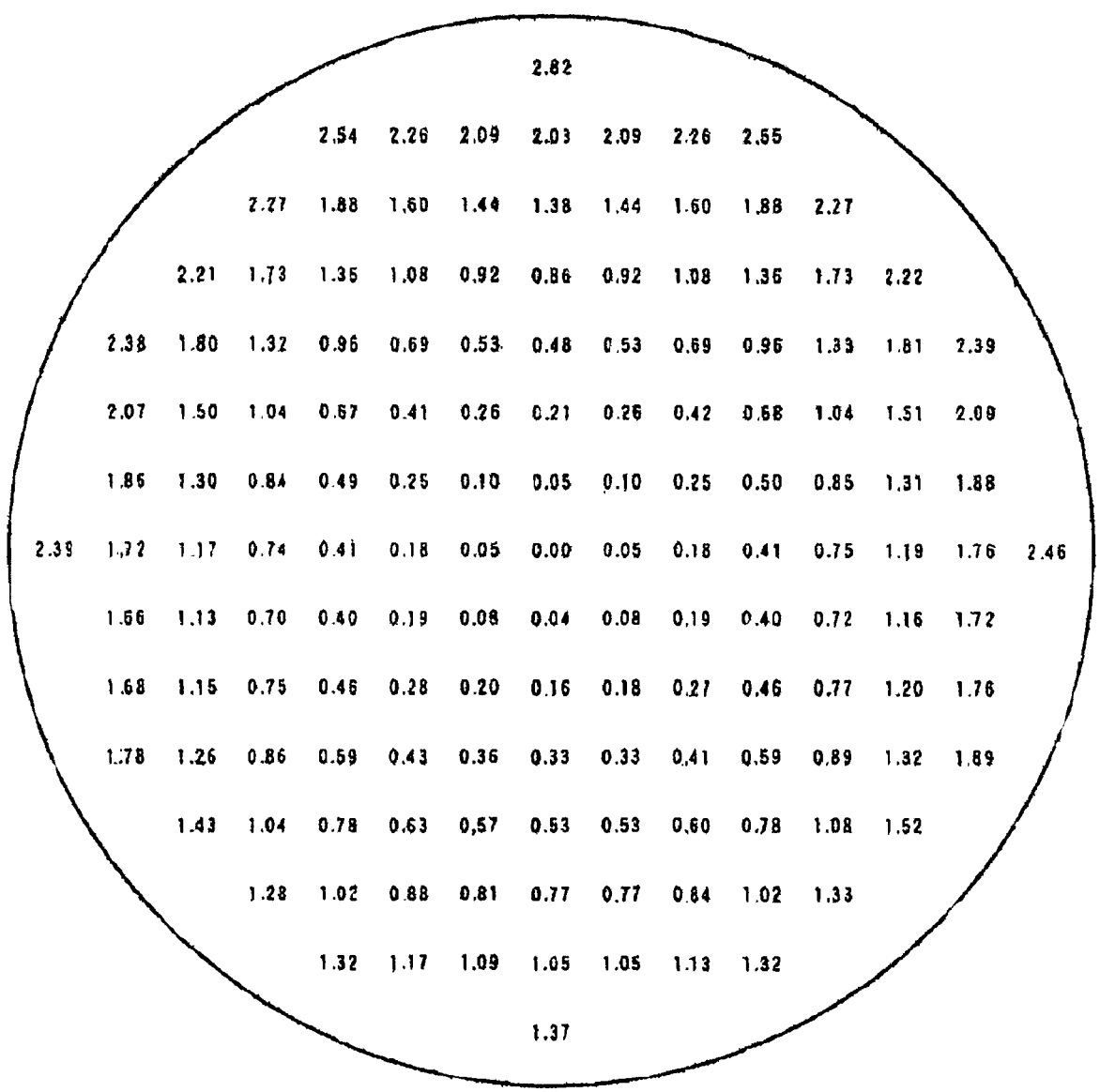
FIG. 16 shows coordinates over the eye-side refractive surface of the progressive-power lens of Comparison Example.

FIG. 13 shows the surface power distribution over the eye-side refractive surface of the right-eye back surface progressive-power lens of this design. FIG. 14 shows the astigmatism distribution over the eye-side refractive surface. FIG. 15 shows the astigmatism distribution in 'as worn' position. FIG. 16 shows coordinates over the eye-side refractive surface with reference to the origin, which is the geometrical center of the lens.

Example 1, Example 2 and Comparison Example employ the same prescribed power, that is, power of distance portion S is 3.50 D and addition power Ad is 2.00 D. The astigmatism distribution in 'as worn' position will now be described with reference to FIG. 7 showing the astigmatism distribution in 'as worn' position of Example 1, FIG. 11 showing the astigmatism distribution in 'as worn' position of Example 2, and FIG. 15 showing the astigmatism distribution in 'as worn' position of Comparison Example. The astigmatism distribution in 'as worn' position of Example 1 in FIG. 7 in which the convex region is simply added to shallow the base curve is significantly degraded compared to that of the conventional back surface progressive-power lens shown in FIG. 15. In contrast, the astigmatism distribution in 'as worn' position of Example 2 in FIG. 11 in which an aspherical surface for correcting the increased astigmatism due to the shallower base curve is added to the eye-side refractive surface is comparable to that of the conventional back surface progressive-power lens shown in FIG. 15, showing that the optical performance is significantly improved.

The invention claimed is:

1. A progressive-power lens comprising:
an object-side refractive surface; and
an eye-side refractive surface, the eye-side refractive surface including:
   a distance portion having power to view relatively distant objects;
   a near portion having power to view relatively near objects; and
   an intermediate portion having power to continuously view intermediate objects between the distant and near objects,
wherein the eye-side refractive surface of the distance portion is concave,
wherein at least part of the eye-side refractive surface of the near portion is a convex region, and
wherein the ratio of the surface area of the convex region within a circle having a radius of 25 mm from the geometrical center of the progressive-power lens to the surface area of the circle is less than or equal to 30%.

2. The progressive-power lens according to claim 1, wherein at least part of the convex region is outside the circle having a radius of 25 mm from the geometrical center of the progressive-power lens.

3. The progressive-power lens according to claim 1 or 2, wherein the absolute value of maximum surface power of the principal meridian of the convex region is not greater than 2 dioptres.

\* \* \* \* \*